United States Patent
Kodama et al.

(10) Patent No.: US 10,213,736 B2
(45) Date of Patent: Feb. 26, 2019

(54) METHOD FOR SEPARATING CARBON DIOXIDE AND APPARATUS FOR SEPARATING CARBON DIOXIDE

(71) Applicants: SUMITOMO CHEMICAL COMPANY, LIMITED, Tokyo (JP); RENAISSANCE ENERGY RESEARCH CORPORATION, Kyoto-shi, Kyoto (JP)

(72) Inventors: Nobutaka Kodama, Osaka (JP); Emi Okubo, Osaka (JP); Osamu Okada, Kyoto (JP); Nobuaki Hanai, Kyoto (JP)

(73) Assignees: SUMITOMO CHEMICAL COMPANY, LIMITED, Chuo-ku, Tokyo (JP); RENAISSANCE ENERGY RESEARCH CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/736,599

(22) PCT Filed: Jun. 17, 2016

(86) PCT No.: PCT/JP2016/068127
§ 371 (c)(1),
(2) Date: Dec. 14, 2017

(87) PCT Pub. No.: WO2016/204279
PCT Pub. Date: Dec. 22, 2016

(65) Prior Publication Data
US 2018/0185784 A1    Jul. 5, 2018

(30) Foreign Application Priority Data

Jun. 18, 2015  (JP) .................................. 2015-122650

(51) Int. Cl.
*B01D 53/22*    (2006.01)
*B01D 69/14*    (2006.01)
(Continued)

(52) U.S. Cl.
CPC ........... *B01D 53/228* (2013.01); *B01D 53/22* (2013.01); *B01D 63/02* (2013.01); *B01D 63/06* (2013.01);
(Continued)

(58) Field of Classification Search
CPC ...... B01D 53/22; B01D 53/228; B01D 53/62; B01D 63/00; B01D 61/00; B01D 2256/22;
(Continued)

(56) References Cited

U.S. PATENT DOCUMENTS 5,445,669 A * 8/1995 Nakabayashi ....... B01D 53/228
                                                      423/226
5,611,843 A * 3/1997 Ho ....................... B01D 53/228
                                                       525/61

(Continued)

FOREIGN PATENT DOCUMENTS

JP  2001-120940 A   5/2001
JP  2008-36464 A    2/2008
(Continued)

OTHER PUBLICATIONS

International Search Report for PCT/JP2016/068127 dated Sep. 6, 2016 [PCT/ISA/210].
(Continued)

*Primary Examiner* — Timothy C Vanoy
(74) *Attorney, Agent, or Firm* — Sughrue Mion, PLLC

(57) ABSTRACT

A carbon dioxide separation method including the steps of: feeding a mixed gas that contains at least carbon dioxide and water vapor to a carbon dioxide separation membrane that
(Continued)

contains a hydrophilic resin and a carbon dioxide carrier; separating, from the mixed gas, a permeation gas that contains the carbon dioxide by use of the carbon dioxide separation membrane; adjusting temperature of gas which contacts the carbon dioxide separation membrane so that a temperature difference between the mixed gas and the permeation gas is not lower than 0° C. and not higher than 20° C.; and adjusting pressure of the permeation gas, the pressure of the permeation gas and water vapor partial pressure in the mixed gas satisfying the following formula (1): 2.5 kPaA<(pressure of permeation gas)<(water vapor partial pressure in mixed gas) . . . (1).

11 Claims, 2 Drawing Sheets

(51) Int. Cl.
| | |
|---|---|
| *B01D 63/10* | (2006.01) |
| *B01D 63/02* | (2006.01) |
| *B01D 63/06* | (2006.01) |
| *B01D 69/00* | (2006.01) |
| *H01M 8/0612* | (2016.01) |
| *H01M 8/0668* | (2016.01) |
| *H01M 8/0662* | (2016.01) |

(52) U.S. Cl.
CPC ............. *B01D 63/10* (2013.01); *B01D 69/00* (2013.01); *B01D 69/142* (2013.01); *B01D 69/148* (2013.01); *B01D 2053/221* (2013.01); *H01M 8/0618* (2013.01); *H01M 8/0668* (2013.01); *H01M 8/0687* (2013.01); *Y02C 10/10* (2013.01)

(58) Field of Classification Search
CPC .......... B01D 2257/504; B01D 2311/06; B01D 2311/10; B01D 2311/14; B01D 2323/02; B01D 2325/36; B01J 19/2475; B01J 2219/00907
See application file for complete search history.

(56) References Cited

U.S. PATENT DOCUMENTS

| | | | |
|---|---|---|---|
| 9,981,847 B2 * | 5/2018 | Okada | ...................... C01B 3/58 |
| 2010/0209693 A1 * | 8/2010 | Hester | .................. B01D 67/009 428/315.5 |
| 2011/0036237 A1 * | 2/2011 | Okada | .................... B01D 69/10 95/51 |
| 2015/0298995 A1 * | 10/2015 | Johann | .................... A61L 2/022 210/650 |
| 2018/0244520 A1 * | 8/2018 | Okada | ....................... C01B 3/58 |

FOREIGN PATENT DOCUMENTS

| | | | |
|---|---|---|---|
| JP | 2009-195900 A | | 9/2009 |
| JP | 2013-22581 A | | 2/2013 |
| JP | 2015-27654 A | | 2/2015 |
| JP | 2017 136546 A | * | 8/2017 ............ B01D 69/00 |

OTHER PUBLICATIONS

International Preliminary Report on Patentability with the translation of Written Opinion dated Dec. 19, 2017, issued by the International Bureau in PCT/JP2016/068127.

* cited by examiner

METHOD FOR SEPARATING CARBON DIOXIDE AND APPARATUS FOR SEPARATING CARBON DIOXIDE

CROSS REFERENCE TO RELATED APPLICATIONS

This application is a National Stage of International Application No. PCT/JP2016/068127, filed on Jun. 17, 2016, which claims priority from Japanese Patent Application No. 2015-122650, filed on Jun. 18, 2015, the contents of all of which are incorporated herein by reference in their entirety.

TECHNICAL FIELD

The present invention relates to a carbon dioxide separation method and a carbon dioxide separation apparatus.

BACKGROUND ART

Steam reforming is one means for feeding hydrogen to a fuel cell. In steam reforming, hydrogen is obtained by the following steps: (i) reacting hydrocarbon and steam with each other to generate carbon monoxide and hydrogen; (ii) further reacting the carbon monoxide and steam with each other to generate carbon dioxide and hydrogen; and (iii) separating the carbon dioxide from a mixed gas that contains the carbon dioxide and the hydrogen.

As a method of separating carbon dioxide from a mixed gas, a membrane separation method has attracted attention in recent years because this method can save energy. As a gas separation membrane used in the membrane separation method, various separation membranes have been proposed. Among such various separation membranes, a facilitated transport separation membrane for separating carbon dioxide is a separation membrane which utilizes a reversible reaction of carbon dioxide and a carbon dioxide carrier, and this facilitated transport separation membrane for separating carbon dioxide has been a subject of vigorous research and development (Patent Literatures 1 and 2). For example, Patent Literature 3 proposes a technique of improving carbon dioxide permeation performance of a carbon dioxide separation membrane. In this technique, water is prevented from evaporating from a permeate side of the carbon dioxide separation membrane by (i) applying a pressure equal to or larger than a saturated steam pressure to the permeate side of the carbon dioxide separation membrane that utilizes a facilitated transport mechanism and (ii) feeding a humidified sweep gas to the permeate side.

CITATION LIST

Patent Literatures

[Patent Literature 1]
Japanese Patent Application Publication, Tokukai, No. 2009-195900 (Publication Date: Sep. 3, 2009)
[Patent Literature 2]
Japanese Patent Application Publication, Tokukai, No. 2001-120940 (Publication Date: May 8, 2001)
[Patent Literature 3]
Japanese Patent Application Publication, Tokukai, No. 2013-22581 (Publication Date: Feb. 4, 2013)

SUMMARY OF INVENTION

Technical Problem

It was, however, found that in a conventional carbon dioxide separation method using a carbon dioxide separation membrane, the carbon dioxide separation membrane did not always achieve a sufficient carbon dioxide permeation performance. The inventors of the present invention found a problem that application of an excessive pressure to a permeate side of the carbon dioxide separation membrane deteriorates the carbon dioxide permeation performance of the carbon dioxide separation membrane due to a decrease in pressure difference between the permeate side and a feed side of the carbon dioxide separation membrane. The inventors of the present invention further found a problem that introduction of the membrane separation method failed to achieve expected energy saving. This was because feeding a humidified sweep gas to the permeate side of the carbon dioxide separation membrane required an additional source of a sweep gas and an additional step of adjusting humidification of the sweep gas. The present invention has solved these problems.

An object of the present invention is to provide a carbon dioxide separation method which allows a carbon dioxide separation membrane to achieve a high carbon dioxide permeation performance, by a configuration which includes the step of adjusting, to a pressure in an appropriate range, pressure of a permeation gas which has permeated the carbon dioxide separation membrane so as to (i) keep a pressure difference between a feed side and a permeate side of the carbon dioxide separation membrane and at the same time, (ii) cause water vapor which permeates the carbon dioxide separation membrane to produce a sweep effect.

Another object of the present invention is to provide a carbon dioxide separation apparatus in which a carbon dioxide separation membrane is excellent in carbon dioxide permeation performance.

Solution to Problem

In order to attain the above objects, the present invention encompasses the following inventions.

[1] A carbon dioxide separation method including the steps of:

feeding a mixed gas that contains at least carbon dioxide and water vapor to a carbon dioxide separation membrane that contains a hydrophilic resin and a carbon dioxide carrier;

separating, from the mixed gas, a permeation gas that contains the carbon dioxide by use of the carbon dioxide separation membrane;

adjusting temperature of gas which contacts the carbon dioxide separation membrane so that a temperature difference between the mixed gas fed to the carbon dioxide separation membrane and the permeation gas which has permeated the carbon dioxide separation membrane is not lower than 0° C. and not higher than 20° C.; and adjusting pressure of the permeation gas which has permeated the carbon dioxide separation membrane, the pressure of the permeation gas which has permeated the carbon dioxide separation membrane and water vapor partial pressure in the mixed gas fed to the carbon dioxide separation membrane satisfying the following formula (1):

$$2.5 \text{ kPaA} < (\text{pressure of permeation gas}) < (\text{water vapor partial pressure in mixed gas}) \quad (1).$$

[2] The carbon dioxide separation method as set forth in [1], wherein
the pressure of the permeation gas which has permeated the carbon dioxide separation membrane is adjusted by a pressure adjusting section.

[3] The carbon dioxide separation method as set forth in [1], wherein
the pressure of the permeation gas which has permeated the carbon dioxide separation membrane is adjusted by utilizing a pressure drop due to a flow channel structure for the permeation gas.

[4] The carbon dioxide separation method as set forth in any one of [1] through [3], wherein
the temperature of the gas which contacts the carbon dioxide separation membrane is adjusted by a temperature adjusting section.

[5] The carbon dioxide separation method as set forth in any one of [1] through [4], wherein
the water vapor partial pressure in the mixed gas fed to the carbon dioxide separation membrane and the pressure of the permeation gas which has permeated the carbon dioxide separation membrane further satisfy the following formula (2):

$$\text{(water vapor partial pressure in mixed gas)} \times 0.25 < \text{(pressure of permeation gas)} < \text{(water vapor partial pressure in mixed gas)} \quad (2).$$

[6] The carbon dioxide separation method as set forth in any one of [1] through [5], wherein
the mixed gas fed to the carbon dioxide separation membrane is at a temperature of not lower than 50° C. and not higher than 140° C., and at a relative humidity of not lower than 50% RH and not higher than 100% RH.

[7] A carbon dioxide separation apparatus used in a carbon dioxide separation method according to any one of [1] through [6], the carbon dioxide separation apparatus including:
at least one carbon dioxide separation membrane module which has a structure partitioned into a feed side and a permeate side by the carbon dioxide separation membrane that contains the hydrophilic resin and the carbon dioxide carrier;
a temperature adjusting section which adjusts a temperature difference between the mixed gas fed to a feed-side inlet of the at least one carbon dioxide separation membrane module and the permeation gas discharged from a permeate-side outlet of the at least one carbon dioxide separation membrane module; and
a pressure adjusting section which adjusts the pressure of the permeation gas discharged from the permeate-side outlet.

[8] The carbon dioxide separation apparatus as set forth in [7], wherein
the carbon dioxide carrier is made of at least one compound selected from the group consisting of alkali metal carbonate, alkali metal bicarbonate, and alkali metal hydroxide.

[9] The carbon dioxide separation apparatus as set forth in [7] or [8], wherein
the carbon dioxide carrier contains at least one of cesium carbonate and cesium hydroxide.

[10] The carbon dioxide separation apparatus as set forth in any one of [7] through [9], wherein
the carbon dioxide separation membrane has a hollow-fiber form, a tubular form or a spiral-wound form.

[11] The carbon dioxide separation apparatus as set forth in any one of [7] through [10], further including a temperature and humidity adjusting section which adjusts temperature of and relative humidity of the mixed gas fed to the carbon dioxide separation membrane.

Advantageous Effects of Invention

A carbon dioxide separation method in accordance with an embodiment of the present invention adjusts, to a pressure in an appropriate range, pressure of a permeation gas which has permeated a carbon dioxide separation membrane. Such adjustment allows for (i) keeping a pressure difference between a feed side and a permeate side of the carbon dioxide separation membrane and at the same time, (ii) causing water vapor which permeates the carbon dioxide separation membrane to produce a sweep effect. This makes it possible to cause the carbon dioxide separation membrane to achieve a high carbon dioxide permeation performance.

An embodiment of the present invention can also provide a carbon dioxide separation apparatus in which a carbon dioxide separation membrane is excellent in carbon dioxide permeation performance.

DESCRIPTION OF EMBODIMENTS

Figure 1:
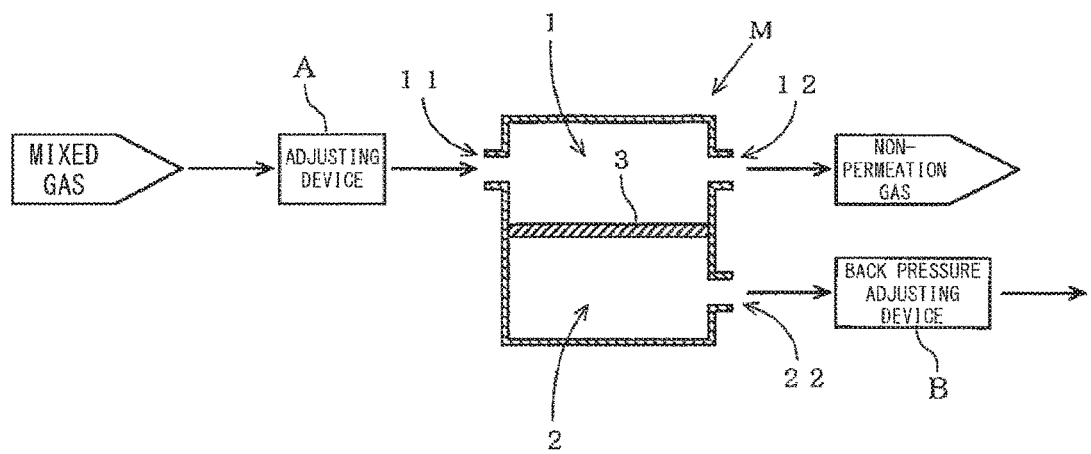
FIG. 1 is a cross-sectional view schematically illustrating an example of a carbon dioxide separation apparatus in accordance with an embodiment of the present invention.

A carbon dioxide separation method in accordance with an embodiment of the present invention includes the steps of: feeding a mixed gas that contains at least carbon dioxide and water vapor to a carbon dioxide separation membrane that contains a hydrophilic resin and a carbon dioxide carrier; separating, from the mixed gas, a permeation gas that contains the carbon dioxide by use of the carbon dioxide separation membrane;
adjusting temperature of gas which contacts the carbon dioxide separation membrane so that a temperature difference between the mixed gas fed to the carbon dioxide separation membrane and the permeation gas which has permeated the carbon dioxide separation membrane is not lower than 0° C. and not higher than 20° C.; and
adjusting pressure of the permeation gas which has permeated the carbon dioxide separation membrane,
the pressure of the permeation gas which has permeated the carbon dioxide separation membrane and water vapor partial pressure in the mixed gas fed to the carbon dioxide separation membrane satisfying the following formula (1):

$$2.5 \text{ kPaA} < \text{(pressure of permeation gas)} < \text{(water vapor partial pressure in mixed gas)} \quad (1).$$

In the arrangement, the pressure of the permeation gas which has permeated the carbon dioxide separation membrane may be adjusted by a pressure adjusting section.

In the arrangement, the pressure of the permeation gas which has permeated the carbon dioxide separation membrane may be adjusted by utilizing a pressure drop due to a flow channel structure for the permeation gas.

In the arrangement, the temperature of the gas which contacts the carbon dioxide separation membrane may be adjusted by a temperature adjusting section.

In the arrangement, it is preferable that the water vapor partial pressure in the mixed gas fed to the carbon dioxide separation membrane and the pressure of the permeation gas which has permeated the carbon dioxide separation membrane further satisfy the following formula (2):

(water vapor partial pressure in mixed gas)×0.25< (pressure of permeation gas)<(water vapor partial pressure in mixed gas)   (2).

In the arrangement, it is preferable that the mixed gas fed to the carbon dioxide separation membrane be at a temperature of not lower than 50° C. and not higher than 140° C., and at a relative humidity of not lower than 50% RH and not higher than 100% RH.

A carbon dioxide separation apparatus in accordance with an embodiment of the present invention is a carbon dioxide separation apparatus used in a carbon dioxide separation method according to any one of the above, the carbon dioxide separation apparatus including: at least one carbon dioxide separation membrane module which has a structure partitioned into a feed side and a permeate side by the carbon dioxide separation membrane that contains the hydrophilic resin and the carbon dioxide carrier; a temperature adjusting section which adjusts temperature of gas contained in the at least one carbon dioxide separation membrane module; and a pressure adjusting section which adjusts the pressure of the permeation gas discharged from a permeate-side outlet of the at least one carbon dioxide separation membrane module.

In the arrangement, it is preferable that the carbon dioxide carrier be made of at least one compound selected from the group consisting of alkali metal carbonate, alkali metal bicarbonate, and alkali metal hydroxide.

In the arrangement, it is preferable that the carbon dioxide carrier contain at least one of cesium carbonate and cesium hydroxide.

In the arrangement, it is preferable that the carbon dioxide separation membrane have a hollow-fiber form, a tubular form or a spiral-wound form.

It is preferable that the carbon dioxide separation apparatus arranged as above further include a temperature and humidity adjusting section which adjusts temperature of and relative humidity of the mixed gas fed to the carbon dioxide separation membrane.

The following description will further discuss the carbon dioxide separation method and the carbon dioxide separation apparatus in accordance with embodiments of the present invention, with reference to the drawings. Note, however, that the present invention is not limited to these embodiments at all.

FIG. 1 is a cross-sectional view schematically illustrating an example of a carbon dioxide separation apparatus in accordance with an embodiment of the present invention. The carbon dioxide separation apparatus illustrated in FIG. 1 includes (i) an adjusting device A which adjusts temperature, humidity, and pressure of a mixed gas to be fed, (ii) a separation membrane module M, and (iii) a back pressure adjusting device B which adjusts pressure of a permeation gas. The separation membrane module M has a structure partitioned into a feed gas flow channel 1 and a permeation gas flow channel 2 by a carbon dioxide separation membrane 3. The feed gas flow channel 1 has walls which are opposed to each other and are provided with a feed-gas inlet 11 and a feed-gas outlet 12, respectively. The permeation gas flow channel 2 has a permeation-gas outlet 22.

Though FIG. 1 illustrates only one separation membrane module M, two or more separation membrane modules M can be connected in parallel or series with each other so as to form a group of separation membrane modules, in accordance with a flow rate of a mixed gas to be fed and a set flow rate of a permeation gas. In a case where the two or more separation membrane modules M are connected in parallel with each other, the back pressure adjusting device B, which adjusts the pressure of the permeation gas, can be provided behind the permeation-gas outlet 22 of each of the two or more separation membrane modules M or behind a bundle of permeation-gas outlets 22 of the two or more separation membrane modules M.

The adjusting device A adjusts temperature, humidity, and pressure of a mixed gas that contains at least carbon dioxide and water vapor. The mixed gas is then fed into the feed gas flow channel 1 through the feed-gas inlet 11. While the mixed gas is flowing through the feed gas flow channel 1, the carbon dioxide contained in the mixed gas permeates the carbon dioxide separation membrane 3 to flow into the permeation gas flow channel 2. A gas (non-permeation gas) obtained by removing the carbon dioxide from the mixed gas is discharged from the feed-gas outlet 12. On the other hand, a permeation gas containing the carbon dioxide which has permeated the carbon dioxide separation membrane 3 is discharged from the permeation-gas outlet 22. The back pressure adjusting device B adjusts pressure of the permeation gas.

What is important here is that the pressure of the permeation gas is adjusted to be larger than 2.5 kPaA and smaller than water vapor partial pressure in the mixed gas. The pressure of 2.5 kPaA is the saturated vapor pressure of water at a temperature of 20° C. In a case where the pressure of the permeation gas is not larger than 2.5 kPaA, a lot of water vapor contained in the mixed gas permeates the carbon dioxide separation membrane 3, and therefore a water content in the mixed gas reduces. This deteriorates carbon dioxide permeation performance of the carbon dioxide separation membrane 3.

In a case where the pressure of the permeation gas is not smaller than the water vapor partial pressure in the mixed gas, the carbon dioxide permeation performance deteriorates due to reduction in pressure difference between a feed side and a permeate side of the carbon dioxide separation membrane 3. The pressure of the permeation gas is more preferably in a range which is larger than {(water vapor partial pressure in mixed gas)×0.25} and smaller than the water vapor partial pressure in the mixed gas. The {(water vapor partial pressure in mixed gas)×0.25} is the saturated vapor pressure of water in a case where temperature of the permeation gas is lower by not less than 20° C. than the temperature of the mixed gas. Heat energy is necessary in discharging, on the permeate side of the carbon dioxide separation membrane, the permeation gas having permeated the carbon dioxide separation membrane. Deficiency of that heat energy occurs in the above case where the temperature of the permeation gas is lower by not less than 20° C. than the temperature of the mixed gas. This results in deterioration in the carbon dioxide permeation performance of the carbon dioxide separation membrane. Setting the pressure of the permeation gas in the above range, expressed by the above formula (1), makes it possible to (i) allow for permeating water vapor to produce an effect similar to that produced by a sweep gas, and at the same time (ii) keep the partial pressure difference of carbon dioxide between the feed side and the permeate side of the carbon dioxide separation membrane 3. This consequently makes it possible to improve the carbon dioxide permeation performance of the carbon dioxide separation membrane 3. A carbon dioxide separation method in accordance with an embodiment of the present invention allows the carbon dioxide separation membrane to achieve a high permeation performance without feeding any sweep gas which was conventionally fed separately into a separation membrane module.

Though not illustrated in FIG. 1, a gas contained in the separation membrane module M may be subjected to temperature adjustment so that a temperature difference between the mixed gas fed to the feed-gas inlet 11 and the permeation gas discharged from the permeation-gas outlet 22 is not lower than 0° C. and not higher than 20° C. Such adjustment of the temperature difference improves an effect produced by setting the pressure of the permeation gas within the range expressed by the above formula (1). In a case where the temperature difference is more than 0° C., the temperature of the permeation gas may be higher or lower than that of the mixed gas. It is, however, preferable that the temperature of the permeation gas be lower than that of the mixed gas.

The temperature of the gas contained in the separation membrane module M can be adjusted by, for example, a temperature adjusting device whose heating medium flows around the separation membrane module M and/or a heat insulating device which uses a heat insulating material to prevent heat radiation from the separation membrane module M.

The adjusting device A adjusts the temperature, the humidity and the pressure of the mixed gas to be fed to the separation membrane module M. The temperature of the mixed gas is preferably not lower than 50° C. and not higher than 140° C. The humidity of the mixed gas is preferably not lower than 50% RH and not higher than 100% RH. Examples of the adjusting device A include a heat exchanger, a pressurizing/decompressing device, a bubble column, and a humidifier which adds steam.

Figure 2:
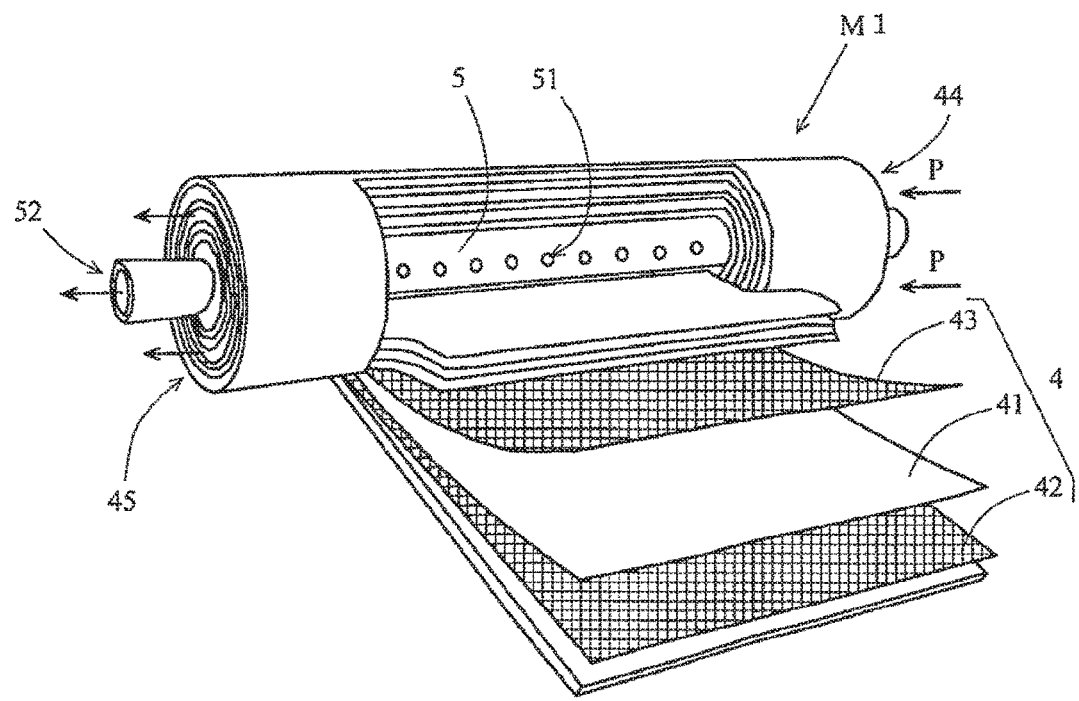
FIG. 2 is a perspective view schematically illustrating a structure of a spiral-wound carbon dioxide separation membrane element that carries out a carbon dioxide separation method in accordance with an embodiment of the present invention, the perspective view partially including a development view of the structure.

Examples of the back pressure adjusting device B include conventionally publicly known pressure adjusting devices such as a pressurizer, a decompressor, and a back pressure valve. Without use of the back pressure adjusting device B, the pressure of the permeation gas which has permeated the carbon dioxide separation membrane can be adjusted by utilizing a pressure drop due to a structure of a flow channel of the separation membrane module M through which flow channel the permeation gas flows. FIG. 2 illustrates an example of a membrane element M1 which is included in the separation membrane module and which can adjust the pressure by use of the structure of the flow channel through which the permeation gas flows.

FIG. 2 is a perspective view schematically illustrating the membrane element M1, the perspective view partially including a development view of the membrane element M1. The membrane element M1 is configured such that a plurality of laminates 4 is wound around a hollow gas collecting tube 5 having a plurality of holes 51. In each of the plurality of laminates 4, a carbon dioxide separation membrane 41, a feed-side channel component 42, and a permeate-side channel component 43 are provided in a laminated state.

In the membrane element M1 configured as above, a mixed gas containing carbon dioxide and water vapor is fed from a feed opening 44 of the membrane element M1 in a direction indicated by an arrow P. While the mixed gas is flowing through the feed-side channel component 42, the carbon dioxide contained in the mixed gas permeates the carbon dioxide separation membrane 41. The carbon dioxide which has been separated from the mixed gas flows through the permeate-side channel component 43, and then is gathered into the gas collecting tube 5. The carbon dioxide thus gathered is subsequently collected via a discharge opening 52 of the gas collecting tube 5. On the other hand, a remaining mixed gas from which the carbon dioxide has been separated is discharged from a discharge opening 45 of the membrane element M1, after having passed through a space in the feed-side channel component 42.

The feed-side channel component 42 and the permeate-side channel component 43 are each required to have, for example, (i) a function of accelerating a turbulent flow of a mixed gas (the surface renewal of a membrane surface) which contains carbon dioxide and water vapor and which has been fed and a permeation gas which has permeated the carbon dioxide separation membrane 41 so as to increase a rate of membrane permeation of the carbon dioxide contained in the mixed gas, (ii) a function of minimizing a pressure drop on the feed side, and (iii) a function as a channel which defines a gas flow channel. The feed-side channel component 42 and the permeate-side channel component 43 are each therefore suitably a mesh channel component. Different mesh shapes define different flow channels for gas. A shape of a unit lattice of a mesh is selected from among shapes such as a rhombus and a parallelogram in accordance with a desired flow channel for gas.

The pressure drop of the permeation gas can be adjusted by a thickness of and/or a structure (such as the mesh shape) of the permeate-side channel component 43. For example, decrease in the thickness of the permeate-side channel component 43 increases the pressure drop of the permeation gas, whereas increase in the thickness of the permeate-side channel component 43 decreases the pressure drop of the permeation gas. The pressure drop of the permeation gas can also be adjusted by adjusting, for example, an internal diameter of the gas collecting tube 5 of the membrane element M1, the number of the holes 51, sizes of the holes 51, and/or locations of the holes 51.

The feed-side channel component 42 and the permeate-side channel component 43 each may be made of any material. However, since the carbon dioxide separation membrane may be used at a temperature of not lower than 100° C., the material is preferably a heat-resistant material such as (i) a fluorine-containing resin such as polytetrafluoroethylene (PTFE), polyvinyl fluoride, and polyvinylidene fluoride, (ii) a resin material such as polyphenylene sulfide (PPS), polyether sulfone, polyether ether ketone (PEEK), polyimide, high-molecular-weight polyester, polyolefin, heat-resistant polyamide, aramid, and polycarbonate, or (iii) an inorganic material such as metal, glass, and ceramics. Among these materials, the material is preferably PTFE, PPS, polyether sulfone, PEEK, polyimide, ceramics, or metal, more preferably PTFE, PPS, PEEK, or metal.

The carbon dioxide separation membrane used in an embodiment of the present invention is not limited to a particular one provided that the carbon dioxide separation membrane contains a hydrophilic resin and a carbon dioxide carrier, and can be a conventionally publicly known carbon dioxide separation membrane. It is, however, more preferable that the carbon dioxide separation membrane be, for example, a laminate of (i) a separate functional layer containing a hydrophilic resin composition that contains a hydrophilic resin and a carbon dioxide carrier and (ii) a porous membrane layer.

Examples of the hydrophilic resin include a vinyl alcohol-acrylate copolymer, polyvinyl alcohol (PVA), polyacrylic acid (PAA), polymaleic acid (PMA), polyfumaric acid, polyvinyl phosphoric acid, and polyvinyl phenol. Suitably used among these is a resin having a physical crosslinked structure formed by hydrogen bonding, specifically, a hydrophilic resin having a hydroxyl group or a carboxyl group, such as a vinyl alcohol-acrylate copolymer, PVA or PAA.

The hydrophilic resin used in an embodiment of the present invention preferably further has a crosslinked structure. Carbon dioxide in the separate functional layer including the hydrophilic resin composition reversibly reacts with the carbon dioxide carrier in water absorbed by the hydrophilic resin, and permeates the separate functional layer by utilizing, as a driving force, a pressure difference between a feed-side gas phase and a permeate-side gas phase which contact the separate functional layer. The hydrophilic resin having the crosslinked structure has a three-dimensional network structure. This allows such a hydrophilic resin to retain a lot of water and at the same time to be resistant to a large pressure difference.

The carbon dioxide carrier can be any carbon dioxide carrier and can be a conventionally publicly known carbon dioxide carrier, provided that the carbon dioxide carrier is present in the separate functional layer and reversibly reacts with the carbon dioxide which has dissolved in the water absorbed by the hydrophilic resin so as to function to selectively allow the carbon dioxide to permeate the separate function layer.

Examples of the carbon dioxide carrier include alkali metal carbonate, alkali metal bicarbonate, and alkali metal hydroxide. An alkali metal which constitutes any of these compounds is preferably Na, K, Rb or Cs each having deliquescence. Examples of the alkali metal carbonate include sodium carbonate, potassium carbonate, rubidium carbonate, and cesium carbonate; examples of the alkali metal bicarbonate include sodium bicarbonate, potassium bicarbonate, rubidium bicarbonate, and cesium bicarbonate; and examples of the alkali metal hydroxide include sodium hydroxide, potassium hydroxide, rubidium hydroxide, and cesium hydroxide. Among these, cesium carbonate and cesium hydroxide are preferable because of their high solubility in water.

A porous membrane is preferably a polymeric porous membrane, and may be made of a conventionally publicly known polymer. Examples of the conventionally publicly known polymer includes (i) polyolefin resins such as polyethylene and polypropylene, (ii) fluorine-containing resins such as PTFE, polyvinyl fluoride, and polyvinylidene fluoride, and (iii) various resins such as polystyrene, cellulose acetate, polyurethane, polyacrylonitrile, polysulfone, polyether sulfone, PEEK, polyimide, polyetherimide, polyamide imide, and polyaramide. Preferably used among the above are PTFE, polysulfone, polyether sulfone, PEEK, polyacrylonitrile, cellulose acetate, polyimide, and polyamide imide. More preferable among the above is PTFE for such reasons as follows: (i) PTFE allows minute pores to be easily formed; and (ii) PTFE can have high porosity, and thus achieves high energy efficiency for separation.

The porous membrane may have any thickness. Typically, the thickness falls preferably within the range of 10 μm to 3000 μm, more preferably within the range of 10 μm to 500 μm, even more preferably within the range of 15 μm to 150 μm, for a greater mechanical strength.

The pores of the porous membrane may have any average pore size. The average pore size is preferably not more than 10 μm, more preferably not more than 1 μm. The porous membrane has a porosity preferably within the range of 5% to 99%, more preferably within the range of 30% to 90%.

The carbon dioxide separation membrane may be in any form. The form is preferably a hollow-fiber form, a tubular form or a spiral-wound form.

EXAMPLES

Examples 1 Through 4, and Comparative Examples 1 Through 5

Under the following conditions and preconditions, a carbon dioxide throughput of a separation membrane module was calculated. Table 1 shows the results of such calculation.
(Mixed Gas Fed to Separation Membrane Module)
(Composition)
Total flow rate: 1 Nm³/h
$CO_2$: 0.2 Nm³/h (20 vol %–wet)
$H_2O$: Corresponding to water vapor partial pressure shown in Table 1
$H_2$: Residual composition from which $CO_2$ and $H_2O$ have been removed
(Temperature, Humidity and Pressure)
See Table 1.
(Preconditions)
No sweep gas was fed to a permeate side of the separation membrane module.
A temperature difference between a mixed gas fed to the separation membrane module and a permeation gas discharged from the separation membrane module was set to 0° C.
$CO_2$ permeance had a dependency (illustrated in FIG. 3) influenced by humidity of a mixed gas which flew on the feed side of the separation membrane module.
$H_2$ did not permeate a carbon dioxide separation membrane included in the separation membrane module.
(Calculation Method)
The following series of specific calculation steps were used to calculate (i) conditions of a remaining mixed gas (gas which did not permeate the carbon dioxide separation membrane included in the separation membrane module) and (ii) conditions of a permeation gas (gas which permeated the carbon dioxide separation membrane included in the separation membrane module), for each of cases where pressure of the permeation gas in the separation membrane module was varied for each mixed gas which satisfied conditions shown in Table 1. The conditions thus calculated are conditions under which a removal ratio of carbon dioxide (=100×flow rate of carbon dioxide in permeation gas/flow rate of carbon dioxide in mixed gas) would be 50%.

Step 1. Calculation was carried out for each given mixed gas in a case where relative humidity of the remaining mixed gas contained in the separation membrane module would be equal to that of the permeation gas contained in the separation membrane module, and the removal ratio of carbon dioxide would be 50%. As a result, the following (i) and (ii) were calculated: (i) humidity of the remaining mixed gas, and a flow rate and partial pressure of carbon dioxide in the remaining mixed gas, and (ii) humidity of the permeation gas, and a flow rate and partial pressure of carbon dioxide in the permeation gas. The above calculation was carried out by a material balance expression.

Figure 3:
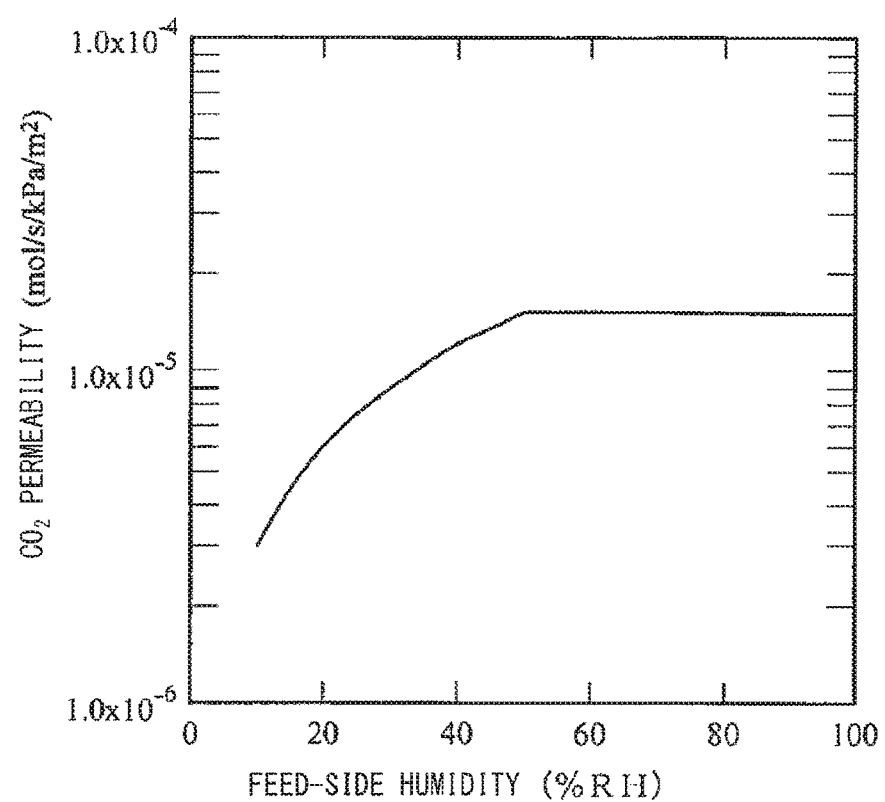
FIG. 3 is a graph showing a relationship between $CO_2$ permeance and feed-side relative humidity, the graph being used in simulations in Examples.

Step 2. $CO_2$ permeance of the mixed gas and $CO_2$ permeance of the remaining mixed gas were calculated from (i)

humidity of the given mixed gas, (ii) the humidity of the remaining mixed gas, which was calculated in Step 1., and (iii) FIG. 3. An average of the $CO_2$ permeances was calculated as $CO_2$ permeance of the carbon dioxide separation membrane included in the separation membrane module.

Step 3. A partial pressure difference, serving as a driving force for membrane permeation, was obtained from partial pressure of carbon dioxide contained in a gas on a feed side of the separation membrane module and partial pressure of carbon dioxide contained in a gas on a permeate side of the separation membrane module. A partial pressure difference of carbon dioxide at an inlet of the separation membrane module was assumed to be equal to partial pressure of carbon dioxide contained in the given mixed gas because no carbon dioxide had permeated the carbon dioxide separation membrane at the inlet. On the other hand, a partial pressure difference of carbon dioxide at an outlet of the separation membrane module was assumed to be a difference between the partial pressure (calculated in Step 1.) of the carbon dioxide contained in the remaining mixed gas and the partial pressure (calculated in Step 1.) of the carbon dioxide contained in the permeation gas. An average value of (i) the partial pressure difference of the carbon dioxide at the inlet of the separation membrane module and (ii) the partial pressure difference of the carbon dioxide at the outlet of the separation membrane module was assumed to be a partial pressure difference of carbon dioxide of the separation membrane module.

Step 4. The following formula was used to calculate a throughput of carbon dioxide (flow rate of carbon dioxide of permeation gas) per unit membrane area of the separation membrane module. The throughput was calculated from (i) the $CO_2$ permeance (calculated in Step 2.) of the separation membrane module and (ii) the partial pressure difference (calculated in Step 3.) of the carbon dioxide of the separation membrane module.

Throughput of carbon dioxide per unit membrane area of separation membrane module $[mol/s/m^2]$=$CO_2$ permeance of separation membrane module $[mol/s/kPa/m^2]$×partial pressure difference of carbon dioxide of separation membrane module $[kPa]$ As is clear from Table 1, in a case where a mixed gas fed to the separation membrane module contained 20 vol % of carbon dioxide at a temperature of 140° C., a humidity of 100% RH, a total pressure of 2500 kPaA, and a water vapor partial pressure of 360 kPa, Examples 1 and 2, in each of which the pressure of the permeation gas was smaller than the water vapor partial pressure in the mixed gas and larger than 2.5 kPaA, had a larger throughput of carbon dioxide per unit membrane area than Comparative Examples 1 and 2 in each of which the pressure of the permeation gas was larger than the water vapor partial pressure in the mixed gas.

Also in the case of a mixed gas at a temperature of 80° C., a humidity of 100% RH, a total pressure of 200 kPaA, and a water vapor partial pressure of 47 kPa, Example 3, in which the pressure of the permeation gas was smaller than the water vapor partial pressure in the mixed gas and larger than 2.5 kPaA, had a larger throughput of carbon dioxide per unit membrane area than Comparative Example 3 in which the pressure of the permeation gas was larger than the water vapor partial pressure in the mixed gas.

Further, also in the case of a mixed gas at a temperature of 50° C., a humidity of 50% RH, a total pressure of 100 kPaA, and a water vapor partial pressure of 6.2 kPa, Example 4, in which the pressure of the permeation gas was smaller than the water vapor partial pressure in the mixed gas and larger than 2.5 kPaA, had a larger throughput of carbon dioxide per unit membrane area than (i) Comparative Example 4 in which the pressure of the permeation gas was larger than the water vapor partial pressure in the mixed gas and (ii) Comparative Example 5 in which the pressure of the permeation gas was smaller than 2.5 kPaA.

INDUSTRIAL APPLICABILITY

A carbon dioxide separation method in accordance with an embodiment of the present invention adjusts, to a pressure in an appropriate range, pressure of a permeation gas which has permeated a facilitated transport separation membrane for separating carbon dioxide. Such adjustment allows for (i) keeping a pressure difference between a feed side and a permeate side of the membrane (carbon dioxide separation

TABLE 1

| | Mixed gas | | | | | Remaining mixed gas | | | Permeation gas | | | Separation membrane module | |
|---|---|---|---|---|---|---|---|---|---|---|---|---|---|
| | Temperature (° C.) | Total pressure (kPaA) | Humidity (% RH) | Partial pressure of $CO_2$ (kPa) | Water vapor partial pressure (kPa) | Pressure (kPaA) | Humidity (% RH) | Partial pressure of $CO_2$ (kPa) | Pressure (kPaA) | Humidity (% RH) | Partial pressure of $CO_2$ (kPa) | Partial pressure difference of $CO_2$ (kPa) | Throughput of $CO_2$ per unit membrane area $(mol/s/m^2)$ |
| Ex. 1 | 140 | 2500 | 100 | 500 | 360 | 2500 | 46 | 309 | 350 | 46 | 184 | 313 | $4.50 \times 10^{-3}$ |
| Ex. 2 | | | | | | | 36 | 314 | 250 | 35 | 122 | 346 | $4.42 \times 10^{-3}$ |
| Comp. Ex. 1 | | | | | | | 55 | 305 | 450 | 55 | 251 | 277 | $4.15 \times 10^{-3}$ |
| Comp. Ex. 2 | | | | | | | 62 | 312 | 550 | 62 | 312 | 250 | $3.75 \times 10^{-3}$ |
| Ex. 3 | 80 | 200 | 100 | 40 | 47 | 200 | 40 | 27 | 30 | 40 | 11 | 28 | $3.78 \times 10^{-4}$ |
| Comp. Ex. 3 | | | | | | | 60 | 26 | 51 | 60 | 22 | 22 | $3.26 \times 10^{-4}$ |
| Ex. 4 | 50 | 100 | 50 | 20 | 6.2 | 100 | 10 | 12 | 3.8 | 10 | 2 | 15 | $1.32 \times 10^{-4}$ |
| Comp. Ex. 4 | | | | | | | 30 | 12 | 16 | 30 | 12 | 10 | $1.20 \times 10^{-4}$ |
| Comp. Ex. 5 | | | | | | | 4.4 | 12 | 1.5 | 4.4 | 1.0 | 16 | $1.26 \times 10^{-4}$ |

In Table 1, "Ex." is an abbreviation of "Example", and "Comp. Ex." is an abbreviation of "Comparative Example".

membrane) and at the same time, (ii) causing water vapor which permeates the carbon dioxide separation membrane to produce a sweep effect. As a result, the carbon dioxide separation membrane achieves a high carbon dioxide permeation performance.

REFERENCE SIGNS LIST

1: feed gas flow channel
2: permeation gas flow channel
3: carbon dioxide separation membrane
4: laminate
5: gas collecting tube
A: adjusting device (temperature and humidity adjusting section)
B: back pressure adjusting device (pressure adjusting section)
M: carbon dioxide separation membrane module
M1: spiral-wound carbon dioxide separation membrane element
11: feed-gas inlet
12: feed-gas outlet
22: permeation-gas outlet
41: carbon dioxide separation membrane
42: feed-side channel component
43: permeate-side channel component
44: feed opening
45: discharge opening
51: hole
52: discharge opening
P: direction in which mixed gas is fed

The invention claimed is:

1. A carbon dioxide separation method comprising the steps of:
feeding a mixed gas that contains at least carbon dioxide and water vapor to a carbon dioxide separation membrane that contains a hydrophilic resin and a carbon dioxide carrier;
separating, from the mixed gas, a permeation gas that contains the carbon dioxide by use of the carbon dioxide separation membrane;
adjusting temperature of gas which contacts the carbon dioxide separation membrane so that a temperature difference between the mixed gas fed to the carbon dioxide separation membrane and the permeation gas which has permeated the carbon dioxide separation membrane is not lower than 0° C. and not higher than 20° C.; and
adjusting pressure of the permeation gas which has permeated the carbon dioxide separation membrane,
the pressure of the permeation gas which has permeated the carbon dioxide separation membrane and water vapor partial pressure in the mixed gas fed to the carbon dioxide separation membrane satisfying the following formula (1):

2.5 kPaA<(pressure of permeation gas)<(water vapor partial pressure in mixed gas)   (1).

2. The carbon dioxide separation method as set forth in claim 1, wherein
the pressure of the permeation gas which has permeated the carbon dioxide separation membrane is adjusted by a pressure adjusting section.

3. The carbon dioxide separation method as set forth in claim 1, wherein
the pressure of the permeation gas which has permeated the carbon dioxide separation membrane is adjusted by utilizing a pressure drop due to a flow channel structure for the permeation gas.

4. The carbon dioxide separation method as set forth in claim 1, wherein
the temperature of the gas which contacts the carbon dioxide separation membrane is adjusted by a temperature adjusting section.

5. The carbon dioxide separation method as set forth in claim 1, wherein
the water vapor partial pressure in the mixed gas fed to the carbon dioxide separation membrane and the pressure of the permeation gas which has permeated the carbon dioxide separation membrane further satisfy the following formula (2):

(water vapor partial pressure in mixed gas)×0.25< (pressure of permeation gas)<(water vapor partial pressure in mixed gas)   (2).

6. The carbon dioxide separation method as set forth in claim 1, wherein
the mixed gas fed to the carbon dioxide separation membrane is at a temperature of not lower than 50° C. and not higher than 140° C., and at a relative humidity of not lower than 50% RH and not higher than 100% RH.

7. A carbon dioxide separation apparatus used in a carbon dioxide separation method according to claim 1, the carbon dioxide separation apparatus comprising:
at least one carbon dioxide separation membrane module which has a structure partitioned into a feed side and a permeate side by the carbon dioxide separation membrane that contains the hydrophilic resin and the carbon dioxide carrier;
a temperature adjusting section which adjusts a temperature difference between the mixed gas fed to a feed-side inlet of the at least one carbon dioxide separation membrane module and the permeation gas discharged from a permeate-side outlet of the at least one carbon dioxide separation membrane module; and
a pressure adjusting section which adjusts the pressure of the permeation gas discharged from the permeate-side outlet.

8. The carbon dioxide separation apparatus as set forth in claim 7, wherein
the carbon dioxide carrier is made of at least one compound selected from the group consisting of alkali metal carbonate, alkali metal bicarbonate, and alkali metal hydroxide.

9. The carbon dioxide separation apparatus as set forth in claim 7, wherein
the carbon dioxide carrier contains at least one of cesium carbonate and cesium hydroxide.

10. The carbon dioxide separation apparatus as set forth in claim 7, wherein
the carbon dioxide separation membrane has a hollow-fiber form, a tubular form or a spiral-wound form.

11. The carbon dioxide separation apparatus as set forth in claim 7, further comprising a temperature and humidity adjusting section which adjusts temperature of and relative humidity of the mixed gas fed to the carbon dioxide separation membrane.

* * * * *